United States Patent
Morris et al.

(10) Patent No.: US 7,103,880 B1
(45) Date of Patent: Sep. 5, 2006

(54) FLOATING-POINT DATA SPECULATION ACROSS A PROCEDURE CALL USING AN ADVANCED LOAD ADDRESS TABLE

(75) Inventors: Dale C. Morris, Steamboat Springs, CO (US); Jerome C. Huck, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 10/426,505

(22) Filed: Apr. 30, 2003

(51) Int. Cl.
*G06F 9/45* (2006.01)
*G06F 15/00* (2006.01)

(52) U.S. Cl. .................. 717/140; 717/136; 717/159; 712/226

(58) Field of Classification Search ............ 717/136, 717/140, 151, 158, 159; 712/226, 245
See application file for complete search history.

(56) References Cited

U.S. PATENT DOCUMENTS

| | | | |
|---|---|---|---|
| 5,542,075 A | 7/1996 | Ebcioglu et al. | |
| 5,611,063 A | 3/1997 | Loper et al. | |
| 5,966,544 A | 10/1999 | Sager | |
| 6,332,214 B1 | 12/2001 | Wu | |
| 6,631,460 B1 * | 10/2003 | Morris et al. | 712/217 |
| 6,658,559 B1 * | 12/2003 | Arora et al. | 712/245 |
| 6,728,867 B1 * | 4/2004 | Kling | 712/216 |
| 6,918,030 B1 * | 7/2005 | Johnson | 712/225 |
| 2003/0135722 A1 * | 7/2003 | Johnson | 712/235 |
| 2004/0059898 A1 * | 3/2004 | Baxter et al. | 712/235 |

OTHER PUBLICATIONS

Cheng et al., "Compiler-directed early load-address generation", Nov. 1998, Proceedings of the 31st annual ACM/IEEE international symposium on Microarchitecture, p. 138-147 □□.*
Lin et al., "Speculative register promotion using advanced load address table (ALAT)", Code Generation and Optimization, 2003. CGO 2003. International Symposium, Mar. 23-26, 2003 pp. 125-134.*

* cited by examiner

*Primary Examiner*—Wei Zhen
*Assistant Examiner*—Philip Wang

(57) ABSTRACT

A method of converting an original code sequence to a modified code sequence where the original code sequence includes a procedure call that is prior to a load instruction that is configured to load a value into one of a first plurality of registers is provided. The method includes inserting an advanced load instruction associated with one of a second plurality of registers into the modified code sequence where the advanced load instruction is configured to cause the value to be loaded into the one of the first plurality of registers. The method also includes inserting the procedure call into the modified code sequence subsequent to the advanced load instruction and inserting a checking instruction associated with the one of the second plurality of registers into the modified code sequence subsequent to the procedure call.

38 Claims, 12 Drawing Sheets

FLOATING-POINT DATA SPECULATION ACROSS A PROCEDURE CALL USING AN ADVANCED LOAD ADDRESS TABLE

THE FIELD OF THE INVENTION

The present invention generally relates to the execution of instructions in computer systems and, more particularly, to floating-point data speculation across a procedure call using an advanced load address table.

BACKGROUND OF THE INVENTION

Computer systems include at least one processor and at least one memory. The memory stores information such as program instructions, data, and an operating system. The program instructions can include a compiler for compiling application programs. The operating system controls the processor and the memory for system operations and for execution of the program instructions.

In the execution of program instructions, data speculation techniques have been used to allow a compiler to schedule a load instruction before one or more logically prior store instructions, i.e., a store instructions that precedes the load instruction in program order, when the compiler has information to suggest that the load and store instructions are unlikely to conflict, i.e., reference the same portion of memory. A load instruction that is scheduled before a logically prior store instruction is known as an advanced load. Because load operations may take a relatively large amount of time to perform by a processor, significant time may be saved by performing a load ahead of schedule.

A hardware structure such as an advanced load address table (ALAT) may be used to monitor advanced loads to ensure that the advanced load does not conflict, i.e., access the same portion of memory, as the store instruction. The compiler schedules a check operation subsequent to the store instruction to query the ALAT to determine whether or not a conflict exists. If a conflict does not exist, then execution continues. If a conflict does exist, then a correction mechanism is invoked to re-do the load associated with the advanced load and any other instructions that were speculatively computed based on the value loaded by the advanced load.

To monitor an advanced load operation, the ALAT typically stores the target register number and the memory location of the advanced load instruction to identify the advanced load operation. If a store is performed to the memory location of the advanced load instruction, then the ALAT entry that contains that memory location number is invalidated. Accordingly, when a checking instruction included as part of an advanced load operation is executed to verify whether a store conflicted with the advanced load, the checking instruction will not find a valid ALAT entry associated with the target register and will cause the correction mechanism to be invoked.

When a called procedure uses the same physical registers as a calling procedure, the register values are typically saved prior to executing the procedure and restored in response to returning from the procedure. Unfortunately, the state of the ALAT is not typically saved across procedures. As a result, a problem can occur with an advanced load that is scheduled prior to a logically prior procedure call where the called procedure uses the same physical registers as the calling procedure. The problem is that a checking instruction associated with an advanced load may fail to detect a conflict with the advanced load when the following two events occur. First, a store that is logically prior to the advanced load instruction conflicts with the advanced load instruction. The store may be in either the called procedure or the calling procedure. Second, the called procedure performs second advanced load to the same target register as the first advanced load.

In response to the first event, the ALAT entry associated with the first advanced load is invalidated, as it should be, because the store conflicts with the first advanced load. The second event, however, causes a second ALAT entry to be created. Because the second advanced load uses the same target register as the first advanced load, the second ALAT entry includes the same target register number that the first ALAT entry included prior to being invalidated. As a result, the checking instruction associated with the first advanced load may detect a valid ALAT entry, i.e., the second ALAT entry, associated with the target register, and incorrectly determine that the first advanced load was successful. This problem generally prevents an advanced load from being performed prior to a procedure call where the calling procedure and the called procedure use the same physical registers.

It would be desirable for computer systems to be able to execute an advanced load prior to a procedure call where the calling procedure and the called procedure use the same physical registers.

SUMMARY OF THE INVENTION

The present disclosure provides a method of converting an original code sequence to a modified code sequence where the original code sequence includes a procedure call that is prior to a load instruction that is configured to load a value into one of a first plurality of registers. The method includes inserting an advanced load instruction associated with one of a second plurality of registers into the modified code sequence where the advanced load instruction is configured to cause the value to be loaded into the one of the first plurality of registers. The method also includes inserting the procedure call into the modified code sequence subsequent to the advanced load instruction and inserting a checking instruction associated with the one of the second plurality of registers into the modified code sequence subsequent to the procedure call.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present disclosure is directed to data speculation prior to a procedure call using an advanced load instruction and an advanced load address table (ALAT) where the called procedure uses the same physical registers as the calling procedure. To perform an advanced load operation prior to a procedure call, an advanced load instruction to a non-stacked register is executed prior to the procedure call. A non-stacked register is distinguished from a stacked register in that a non-stacked register is part of a set of registers that are not managed by a stack mechanism whereas a stacked register is part of a set of registers that are managed by a stack mechanism. The advanced load instruction specifies, either implicitly or explicitly, a first value that differs from a second value that identifies the non-stacked register. The first value is stored in an advanced load address table (ALAT) entry associated with the advanced load instruction. A checking instruction is executed in the calling procedure subsequent to the procedure call to determine whether a conflict occurred with the advanced load instruction using the first value.

Because the checking instruction does not use the non-stacked register identifier when accessing the ALAT, the checking instruction will not incorrectly determine that a conflict did not occur with the advanced load instruction as a result of an ALAT entry created by an advanced load instruction that uses the non-stacked register within the procedure called by the procedure call. If a conflict did not occur, then the advanced load instruction was successfully executed prior to the procedure call. If a conflict occurred, remedial instructions are executed to re-do the load associated with the advanced load instruction.

These aspects of the present disclosure may be employed with any type of computer system that includes a microprocessor or microcontroller-based architecture such as a personal computer, a laptop, a server, a personal digital assistant (PDA), a mobile telephone, a printer, a multi-function device, a television, or an audio device. Selected portions of an embodiment of a computer system 100 are shown in FIG. 1.

Figure 1:
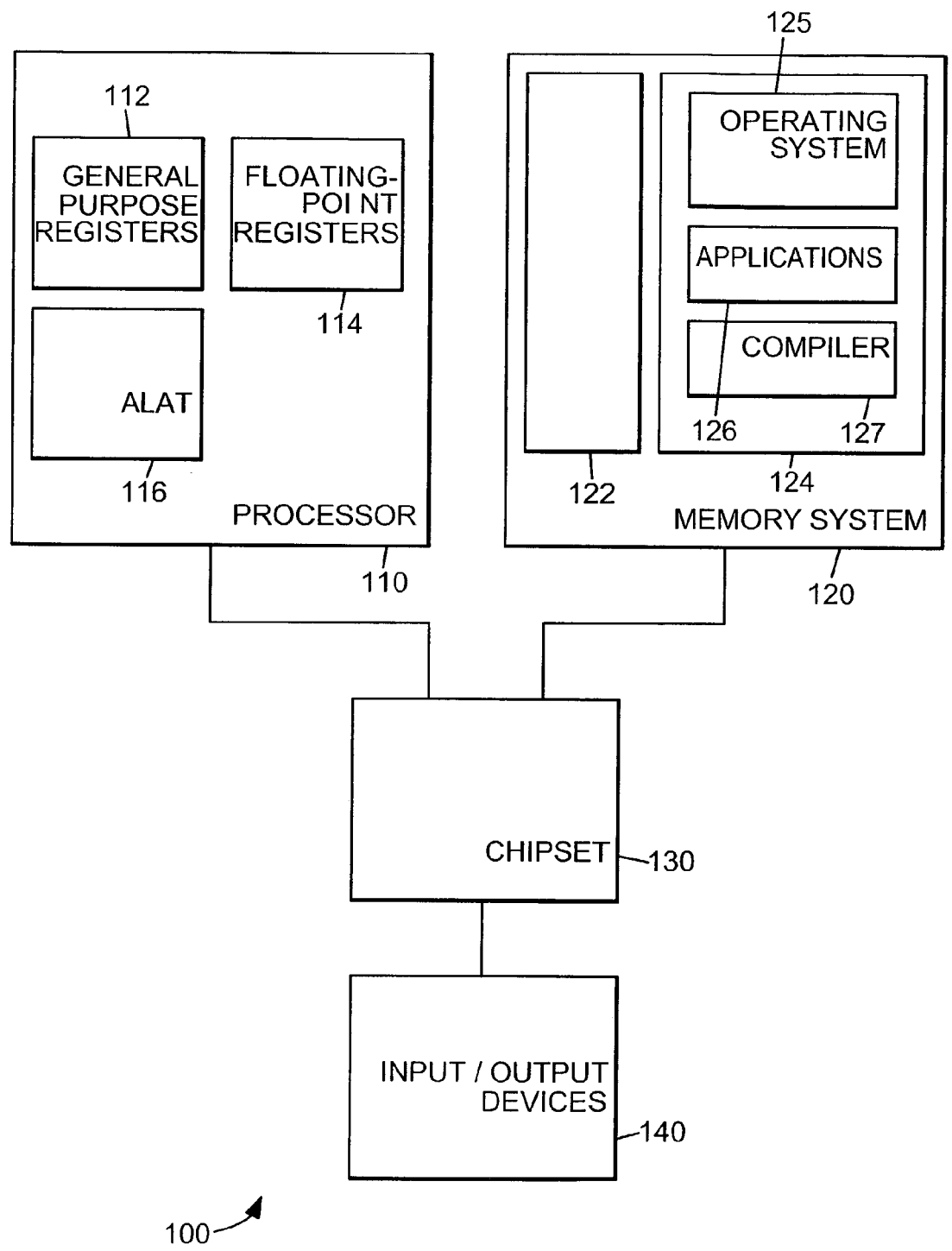
FIG. 1 is a block diagram illustrating an embodiment of selected portions of computer system.

In FIG. 1, computer system 100 includes a processor 110, a memory system 120, and input/output devices 130. Processor, 110 includes general purpose registers 112, floating-point registers 114, and an advanced load address table (ALAT) 116. Memory 120 includes a first level of memory 122 and a second level of memory 124. The second level of memory 124 initially stores an operating system 125, one or more applications 126, and a compiler 127. Computer system 100 is configured to execute operating system 125, applications 126, and compiler 127 using processor 110. Operating system 125, applications 126, and compiler 127 may be copied into the first level of memory 122 prior to being executed by processor 110.

In the embodiment of FIG. 1, processor 110 comprises a processor from the Itanium™ family of processors available from Intel. In other embodiments, processor 110 may be another type of processor. In addition, other embodiments may include multiple processors 110.

In the embodiment of FIG. 1, general purpose registers 112 comprise a stacked register set, and floating-point registers 114 comprises a non-stacked register set. A stacked register set includes a register stack mechanism (not shown) configured to rename registers. A stacked register is addressable by a program using a virtual address which is mapped onto a physical register by the register stack mechanism. Accordingly, multiple registers in a stacked register set may have the same virtual address at different points in program execution. For example, although two different procedures may use the register address "r32", the register stack mechanism may assign different physical registers for each use of the register address "r32". A non-stacked register set comprises registers that are directly addressable using their physical addresses. Thus, different procedures use the same register address, such as "f2", to access the same physical register in the non-stacked register set. In other embodiments, general purpose registers 112 and floating-point registers 114 may be stacked or non-stacked register sets.

Figure 2:
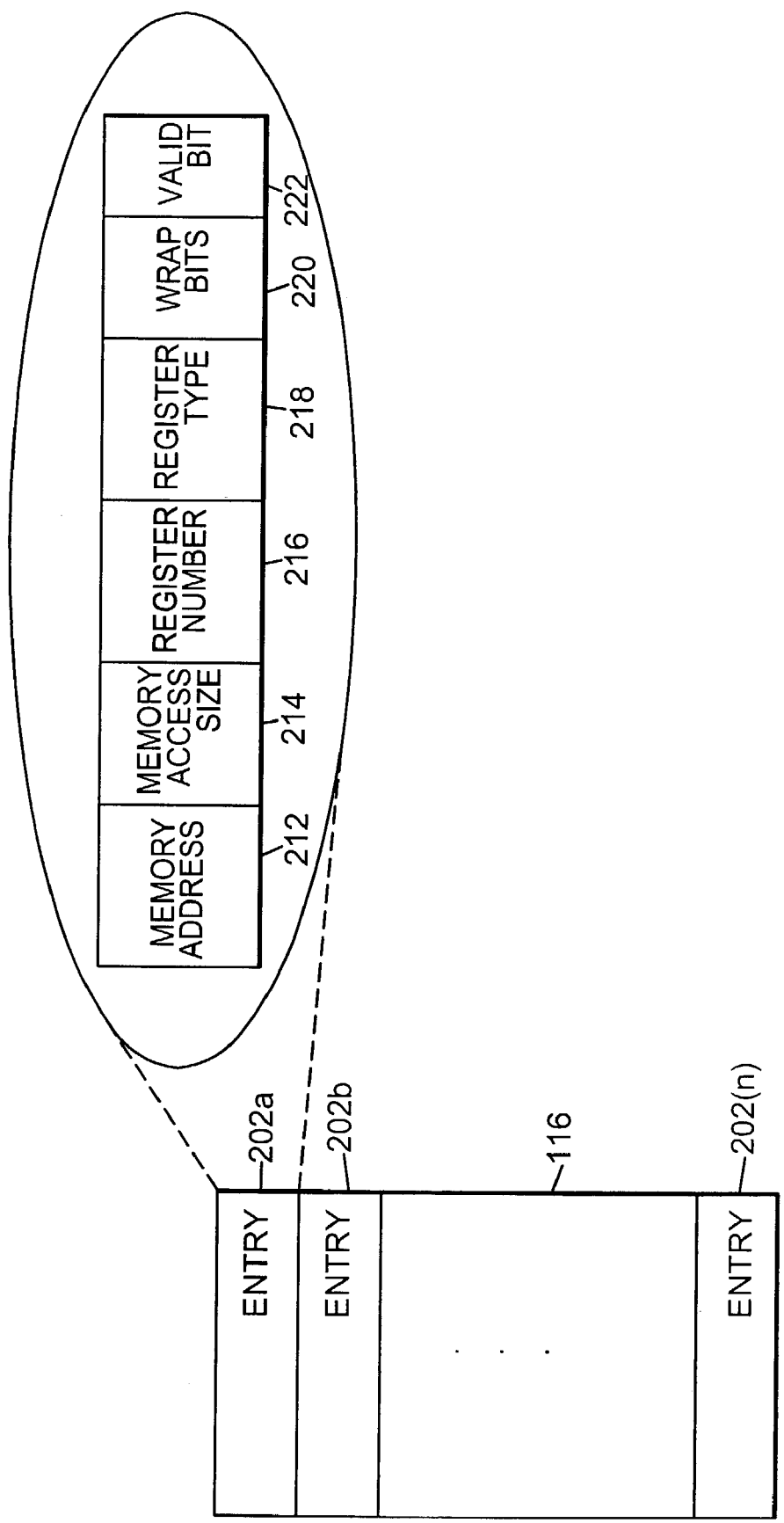
FIG. 2 is a block diagram illustrating a first embodiment of an advanced load address table.

FIG. 2 illustrates an embodiment of ALAT 116. In the embodiment of FIG. 2, ALAT 116 includes a plurality of entries 202a through 202(n) where n is an integer greater than zero. Each entry 202 includes a memory address field 212, a memory access size field 214, a register number field 216, a register type field 218, a wrap bits field 220 and a valid bit 222.

Processor 110 causes an ALAT entry 202 to be created in response to executing a standard advanced load instruction. The entry 202 stores the memory address of the advanced load in memory address field 212, the size of the memory access in memory access size field 214, the register number of the target register, i.e., the register being loaded with a value, in the register number field 216, and the type of register (e.g., a general purpose register from general purpose registers 112 or a floating-point register from floating-point registers 114) of the target register in register type field 218. Wrap bits 220 store an encoding used to handle stack overflow situations as described in U.S. patent application Ser. No. 09/559,508, entitled "Advanced Load Address Table Entry Invalidation based on register address wrap-around", filed on Apr. 27, 2000, and listing Dale Morris et al. as inventors. The valid bit 222 of an entry 202 is set in response to the entry being created.

In the embodiments described herein, a new type of advanced load instruction is disclosed that differs from a standard advanced load instruction. With this new type of advanced load instruction, an advanced load instruction specifies a special checking value and causes the special checking value to be stored in the ALAT entry associated with an advanced load instruction instead of values that indicate the target register of the advanced load instruction. In particular, the new type of advanced load instruction causes the special checking value to be stored in the register number field 216 of an ALAT entry 202. A checking instruction associated with the new type of advanced load instruction uses the special checking value, rather than the value of the target register, when it causes the ALAT 116 to be accessed to determine whether a conflict occurred.

As will be described in additional detail below with respect to FIGS. 7–11, this new type of advanced load instruction may also cause a checking type value to be stored in the register type field 218 that differs from the value that represents general purpose registers 112 and the value that represents floating-point registers 114. The following description will use the term advanced load instruction to refer to this new type of advanced load instruction.

Figure 3A:
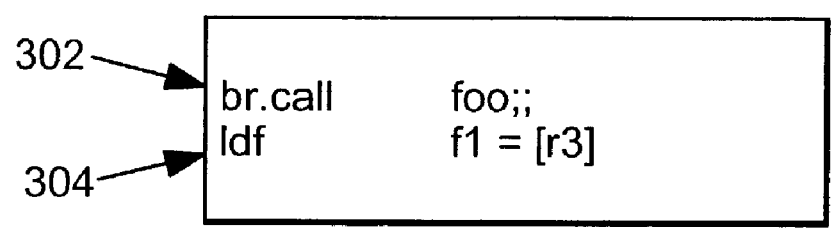
FIG. 3a is a diagram illustrating an example of an original code portion.
Figure 3B:
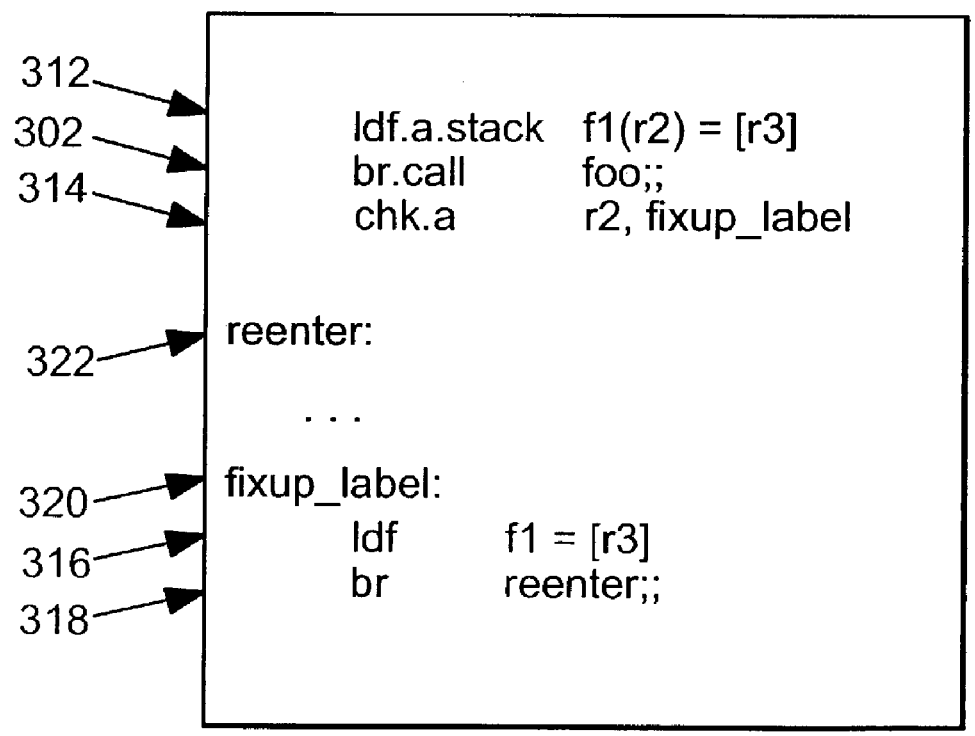
FIG. 3b is a diagram illustrating a first example of a modified code portion.

The embodiment of FIG. 1 is configured to perform data speculation prior to a procedure call using an advanced load instruction and ALAT 116 where the called procedure and the calling procedure each use floating-point registers 114. FIG. 3a is a diagram illustrating an example of an original code portion 300, and FIG. 3b is a diagram illustrating an example of a modified code portion 310 that includes instructions configured to perform data speculation across a procedure call where the calling procedure and the called procedure use the same physical registers, i.e., registers from floating-point registers 114.

As shown in the original code portion 300, a load instruction 304 is configured to cause a floating-point register "f1" to be loaded with a value from an address stored in general purpose register "r3" subsequent to a procedure call that is configured to cause to a procedure called "foo" to be executed as indicated by a branch instruction 302.

In the modified code portion 310, load instruction 304 is replaced with an advanced floating-point load instruction 312 and moved prior to the procedure call 302. Advanced load instruction 312 is tagged with a ".stack" indicator to distinguish it from a standard advanced load instruction. Advanced load instruction 312 specifies a special checking value as "(r2)" to indicate explicitly that this general register specifier "r2" from general purpose registers 112 will serve as the special checking value in this example. A checking instruction 314 associated with advanced load instruction 312 is added subsequent to procedure call 302. Checking instruction 314 specifies "r2" as the value to use in accessing ALAT 116. In addition, remedial instructions 316 and 318 and labels 320 and 322 are included in case a conflict occurs with advanced load instruction 321.

In execution, advanced load instruction 312 causes a value to be loaded from an address stored in "r3" to a one of the floating-point registers 112, i.e., "f1". In addition, advanced load instruction 312 causes entry 202a, for example, associated with the special checking value, in this case general purpose register "r2", to be created in ALAT 116. In particular, advanced load instruction 312 causes a value that identifies "r2", instead of a value that identifies floating-point register "f1", to be stored in the register number field 216 and causes a value associated with general purpose registers 112, instead of a value associated with floating-point register registers 114, to be stored in register type field 218.

Subsequent to the execution of advanced load instruction 312, procedure call 302 causes a procedure "foo" to be called. After the procedure "foo" is executed, checking instruction 314 causes the validity of the entry 202 associated with advanced load instruction 312 to be examined to determine whether a store conflicted with advanced load instruction 312. Checking instruction 314 causes entry 202a to be accessed using the special checking value, i.e., the value that identifies "r2".

Any instruction in the procedure "foo" or in any procedure called within procedure "foo" that conflicts with advanced load instruction 312 will cause entry 202a to be invalidated to indicate that a conflict occurred. For example, a store within procedure "foo" may conflict with advanced load instruction 312 by storing a value to the address associated with advanced load instruction 312. Entry 202a includes the address of the value that is loaded into a target register in response to advanced load instruction 312.

In addition, an instruction outside of the procedure "foo" that conflicts with advanced load instruction 312 causes the entry 202a to be invalidated to indicate that a conflict occurred if that instruction is executed between the execution of advanced load instruction 312 and the execution of checking instruction 314. In embodiments that include multiple processors 110, an instruction that conflicts with advanced load instruction 312 may be executed by any of the processors 110.

If a conflict occurred with advanced load instruction 312, processor 110 executes remedial instructions 316 and 318 to re-do the load associated with advanced load instruction 312. In particular, checking instruction 314 causes a program segment at label 320, i.e., "fixup_label", to be branched to in response to a conflict being detected. The program segment that begins at label 320 includes a floating-point load instruction 316 that effectively re-does the load by loading the value from the address stored in "r3" into register "f1". A branch instruction 318 then causes the program to return to the point indicated by label 322, i.e., "reenter". In this way, remedial instructions 316 and 318 cause the correct value to be loaded into register "f1" then cause the program to resume.

If a conflict did not occur, then advanced load instruction 312 was successfully executed prior to procedure call 302 and no further action is needed.

Embodiments of methods to perform the type of data speculation described above are shown in FIGS. 4–6 and will be described with reference to modified code portion 310.

Figure 4:
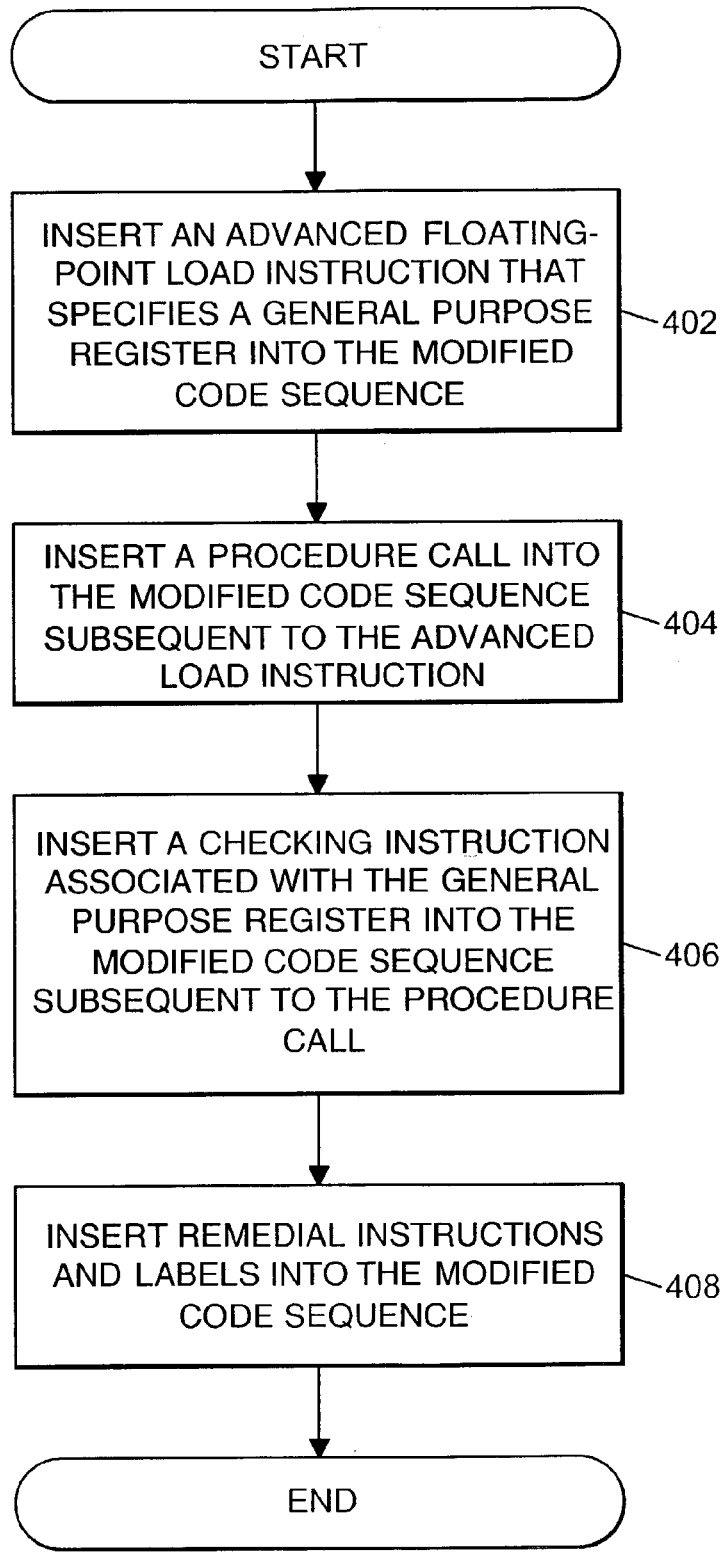
FIG. 4 is a flow chart illustrating a first embodiment of a method for scheduling an advanced load operation prior to a procedure call.

FIG. 4 is a flow chart illustrating an embodiment of a method for scheduling an advanced load operation prior to a procedure call where the calling procedure and the called procedure may each use a non-stacked register set such as floating-point registers 114. As noted above, floating-point registers 114 are addressable by a procedure using their physical addresses, e.g., "f1".

In FIG. 4, advanced floating-point load instruction 312 that specifies a general purpose register "r2" is inserted into the modified code sequence as indicated in a block 402. Advanced load instruction 312 is configured to load a value from an address into a target register, "f1", in floating-point registers 114. Advanced load instruction 312 is also configured to cause an entry 202 to be created in ALAT 116 and store a value that identifies general purpose register "r2" in the entry along with the address, a size of the load, and a register type specification that indicates that "r2" is a general purpose register. Advanced load instruction 312 is also configured not to store a value that identifies the floating-point target register "f1" in the entry.

Procedure call 302 is inserted into the modified code sequence subsequent to advanced load instruction 312 as indicated in a block 404.

Checking instruction 314 associated with the general purpose register "r2" and advanced load instruction 312 is inserted into the modified code sequence as indicated by a block 406. Checking instruction 314 is inserted subsequent to the procedure call and is used to determine whether a conflict occurred with advanced load instruction 312. Remedial instructions 316 and 318 and labels 320 and 322 are inserted into the modified code sequence as indicated in a block 408.

The embodiment of the method described in FIG. 4 is employed by compiler 127. Accordingly, compiler 127 may cause data speculation to occur prior to a procedure call by scheduling instructions for execution in a program using the method just described. Compiler 127 is one example of a program that is storable on a computer-readable medium, such as memory system 120, and is executable by computer system 100. In other embodiments, compiler 127 may be stored on and executed from other computer-readable media including portable media such as a disk or CD-ROM to create programs that include the data speculation technique illustrated in FIG. 4.

Figure 5:
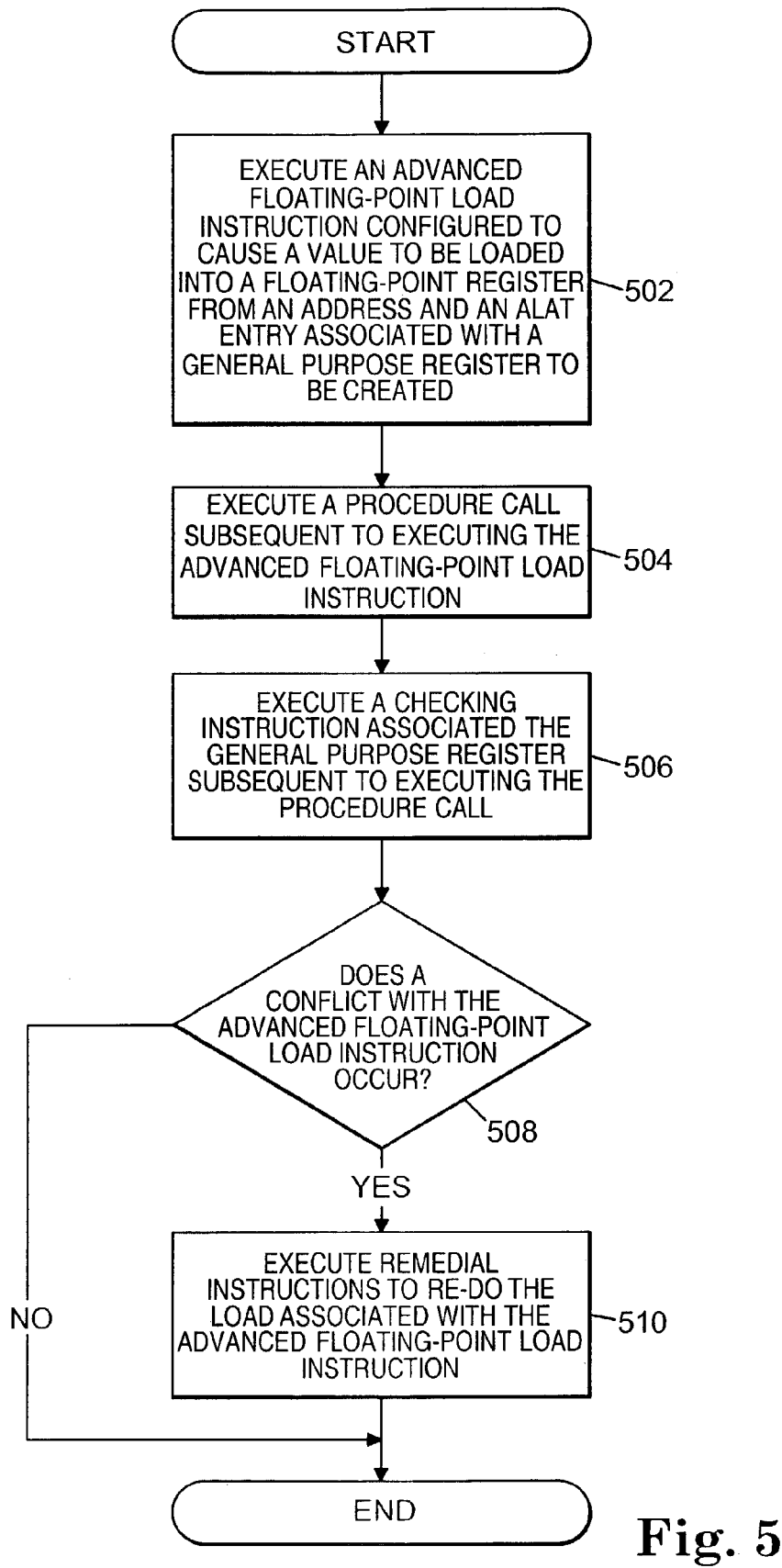
FIG. 5 is a flow chart illustrating a first embodiment of a method for performing an advanced load operation prior to a procedure call.

FIG. 5 is a flow chart illustrating an embodiment of a method for executing instructions to cause an advanced load operation to be performed prior to a procedure call where the calling procedure and the called procedure may each use a non-stacked register set such as floating-point registers 114. In particular, processor 110 executes the instructions in modified code sequence 310 such that advanced load instruction 312 is executed prior to procedure call 302.

In FIG. 5, floating-point advanced load instruction 312, which is configured to cause a value to be loaded from an address into a register "f1" from floating-point registers 114 and an ALAT entry 202 associated with a general purpose register "r2" to be created, is executed as indicated in a block 502. Procedure call 302 is executed subsequent to executing advanced load instruction 312 as indicated by a block 504. Accordingly, the load caused by advanced load instruction 312 logically occurs prior to the procedure, "foo", being called for execution by procedure call 302.

Checking instruction 314, which is associated with the general purpose register "r2" and advanced load instruction 312, is executed subsequent to executing procedure call 302 as indicated by a block 506. Processor 110 executes checking instruction 314 to determine whether a conflict occurred with advanced load instruction 312.

A determination is made as to whether a conflict with floating-point advanced load instruction 312 occurred as indicated in a block 508. By executing checking instruction 314, processor 110 determines whether the entry 202 in ALAT 116 that is associated with advanced load instruction 312 and includes a value that identifies general purpose register "r2" is valid. If the entry 202 is valid, then no conflict occurred, and if the entry 202 is invalid, then a conflict occurred. If a conflict occurred, then remedial instructions 316 and 318 are executed to re-do the load associated with advanced load instruction 312 as indicated in a block 510. If no conflict occurred, then no further action is necessary.

Figure 6:
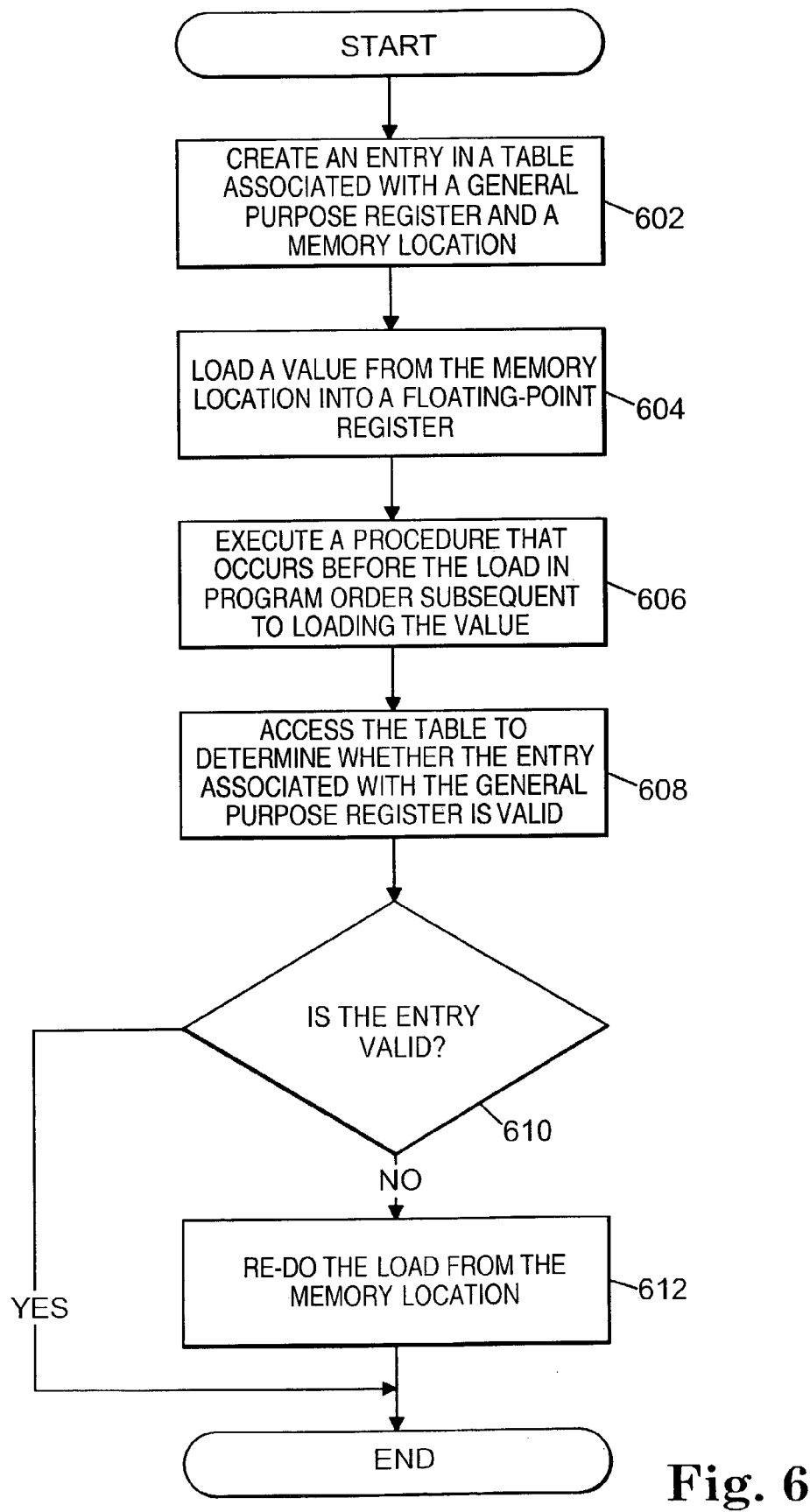
FIG. 6 is a flow chart illustrating a first embodiment of a method for executing instructions to cause an advanced load operation to be performed prior to a procedure call.

FIG. 6 is a flow chart illustrating an embodiment of a method for performing an advanced load operation prior to a procedure call where the calling procedure and the called procedure may each use a non-stacked register set such as floating-point registers 114. Processor 110 is configured to perform the method of FIG. 6.

In FIG. 6, an entry, such as an entry 202, associated with a general purpose register "r2" and a memory location is created in a table, such as ALAT 116, as indicated by a block 602. A value is loaded from the memory location into a floating-point register "f1" as indicated in a block 604. Processor 110 performs the functions of blocks 602 and 604 in response to a single instruction such as advanced load instruction 312.

A procedure that occurs before the load, in program order, is executed as indicated in a block 606. Any instruction in the procedure or in a procedure called within the procedure that conflicts with the load causes the entry created by the function in block 602 to be invalidated. The table is accessed to determine whether the entry associated with general purpose register "r2" is valid as indicated in a block 608. A determination is made as to whether the entry is valid as indicated in a block 610. If the entry is valid, then no conflict occurred and there is no need to re-do the load from block 604. If the entry is not valid, then a conflict occurred and the load from block 604 is re-done as indicated in a block 612.

In the embodiment described above with reference to FIGS. 1–6, the special checking value used by advanced load instruction 312 identified a general purpose register in general purpose registers 112. Because the physical register of the general purpose register that is identified by the special checking value is not actually used by advanced load instruction 312, compiler 127 may allow the physical register to be used by other instructions, except for other advanced load instructions, during the advanced load operation. Compiler 127 prevents the physical register identified by the special checking value from being used by other advanced load instructions so that other ALAT entries associated with the physical register that could cause an erroneous indication of success of advanced load instruction 312 are not created by other advanced load instructions.

Figure 7:
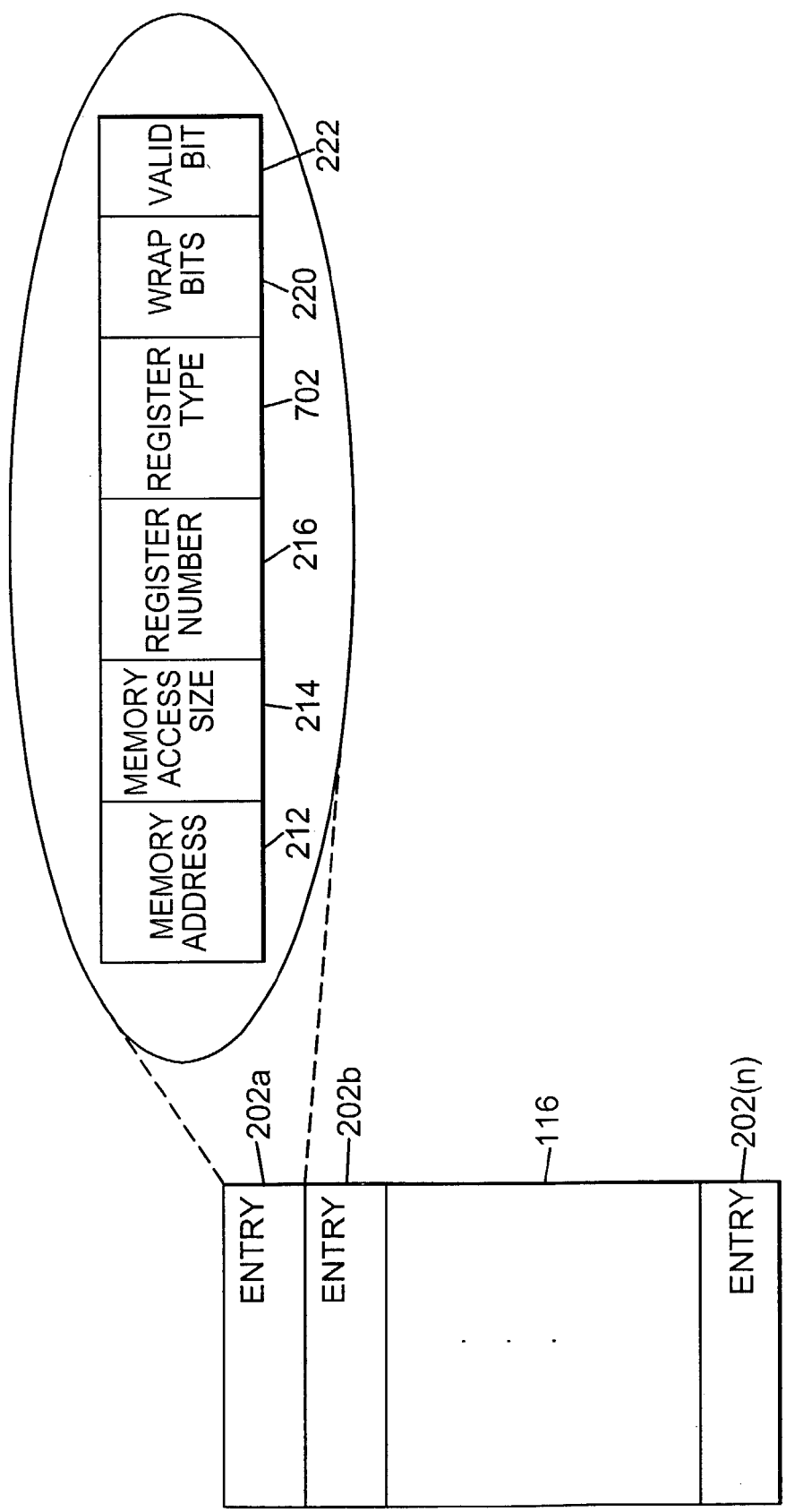
FIG. 7 is a block diagram illustrating a second embodiment of an advanced load address table.

FIG. 7 is a block diagram illustrating a second embodiment of advanced load address table 116. The embodiment of FIG. 7 differs from the embodiment of FIG. 2 in that the embodiment of FIG. 7 includes register type field 702 instead of register type field 218. As described above, register type field 218 is configured to store either a value that indicates general purpose registers 112 or a value that indicates floating-point registers 114. Accordingly, register type field 218 may be implemented using a single bit to indicate one of two possible states.

Register field 702, however, is configured to store a value that indicates general purpose registers 112, a value that indicates floating-point registers 114, or a value that signifies that the ALAT entry is associated with an advanced floating-point load instruction that executed prior to a procedure call. Accordingly, register type field 702 is implemented using at least two bits so that it may indicate one of three possible states.

By including at least one extra bit in register type field 702, the use of an ALAT entry by an advanced floating-point load instruction that executed prior to a procedure call is specifically identified. The value stored in register type field 702 is associated with the advanced floating-point load instruction. As a result, the ALAT entry can be distinguished from an ALAT entry generated by an advanced general purpose load instruction. Because the entries can be distinguished, compiler 127 may allow the physical register associated with the general purpose register used by an advanced floating-point load instruction prior to a procedure call to be used by any other instructions, including other advanced load instructions, during the advanced floating-point load operation.

The embodiment shown in FIG. 7 may be substituted for the embodiment shown in FIG. 2 in the embodiments described with reference to FIGS. 1 and 3–6 above.

The embodiments described below with reference to FIGS. 8–11 operate using the embodiment of ALAT 116 shown in FIG. 7.

Figure 8:
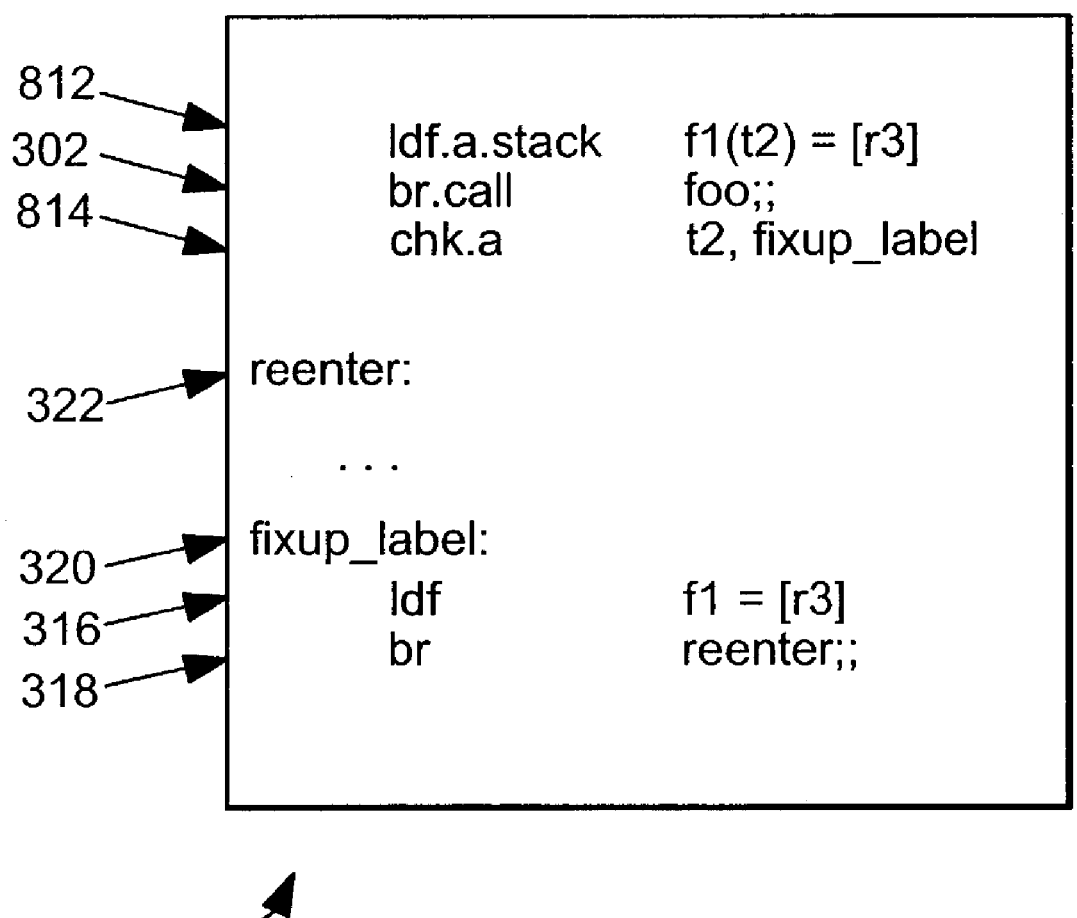
FIG. 8 is a diagram illustrating a second example of a modified code portion.

FIG. 8 is a diagram illustrating a second example of a modified code portion 800. Like modified code portion 310 from FIG. 3b, modified code portion 800 is associated with original code portion 300 from FIG. 3a.

Modified code portion 800 includes an advanced floating-point load instruction 812 in place of the advanced floating-point load instruction 312. Advanced load instruction 812 operates substantially the same way as advanced load instruction 312 as described above with two exceptions. First, advanced load instruction 812 specifies a tag value "(t2)" as its special checking value, instead of a value that indicates a general purpose register number, and causes this tag value to be stored in register number field 216 of its associated ALAT entry 202. Second, advanced load instruction 812 causes a value to be stored in register field 702 in the ALAT entry 202 that indicates that the entry 202 is associated with an advanced floating-point load instruction that executed prior to a procedure call. As noted above with reference to FIG. 7, this value stored in register field 702 differs from values associated with general purpose registers 112 and floating-point registers 114.

Because the special checking value for advanced load instruction 812 is a tag value "t2", modified code portion 800 includes checking instruction 814 in place of checking instruction 314. Checking instruction 814 is associated with advanced load instruction 812 and specifies "t2" as the value to use in accessing ALAT 116. After the procedure "foo" is executed, checking instruction 814 causes the validity of the entry 202 associated with advanced load instruction 812 to be examined to determine whether a store conflicted with advanced load instruction 812. Checking instruction 814 causes entry 202 to be accessed using the special checking value, i.e., the tag value "t2". Conflicts are handled in the manner described above with reference to modified code portion 310.

By using a tag value as a special checking value, compiler 127 does not allocate a general purpose register for advanced load instruction 812. Accordingly, the use of advanced load instruction 812 by compiler 127 does not place any restrictions on the use of any of general purpose registers 112.

In addition, ALAT 116 implements a renaming scheme to rename tag values on subsequent procedure calls in a manner similar to the renaming of stacked registers. In particular, ALAT 116 prevents a particular tag value from being re-used by any other advanced load instruction in a procedure called within the procedure "foo". For example, ALAT 116 ensures that the tag value that is labeled "t2" for the procedure "foo" differs from any other tag value used by a procedure within "foo" even if the label "t2" is used.

Figure 9:
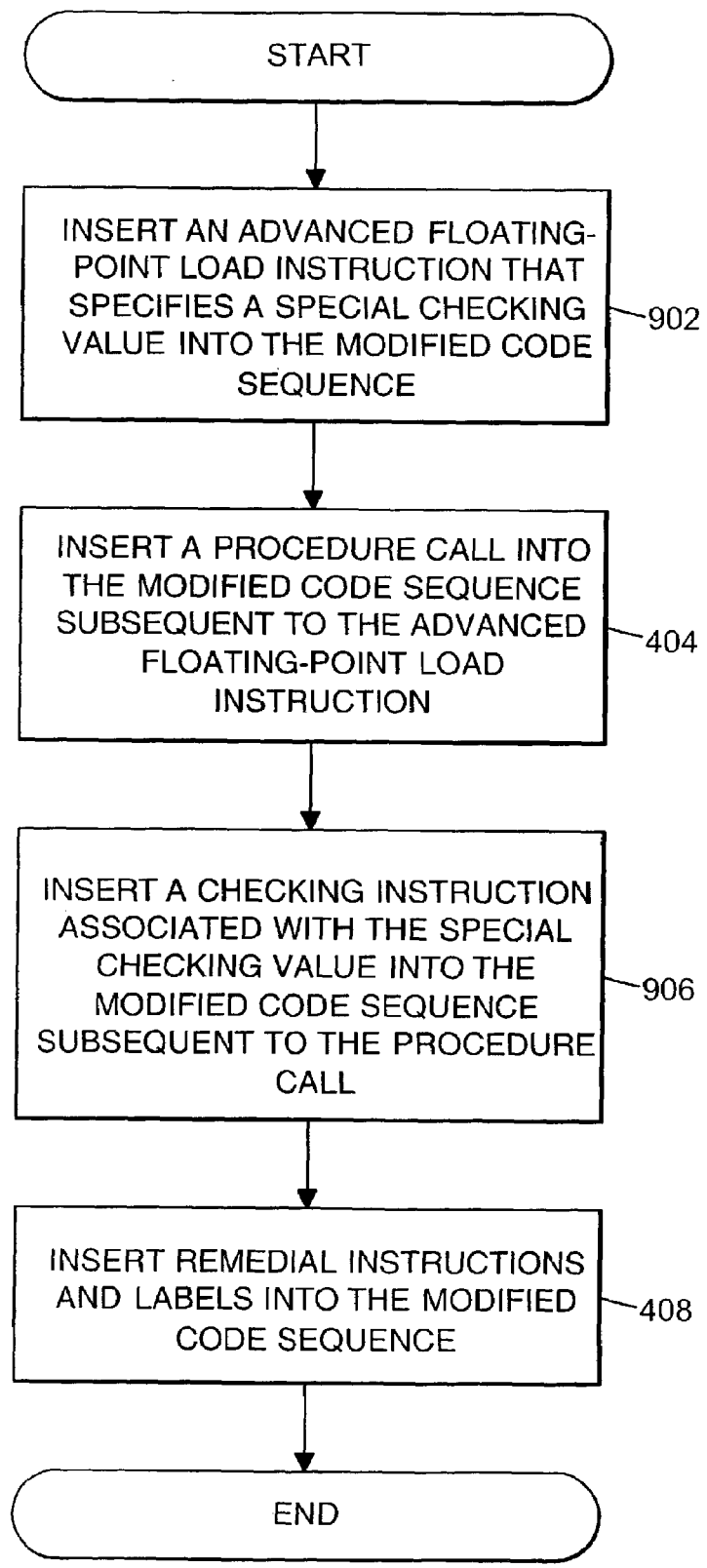
FIG. 9 is a flow chart illustrating a second embodiment of a method for scheduling an advanced load operation prior to a procedure call.
Figure 10:
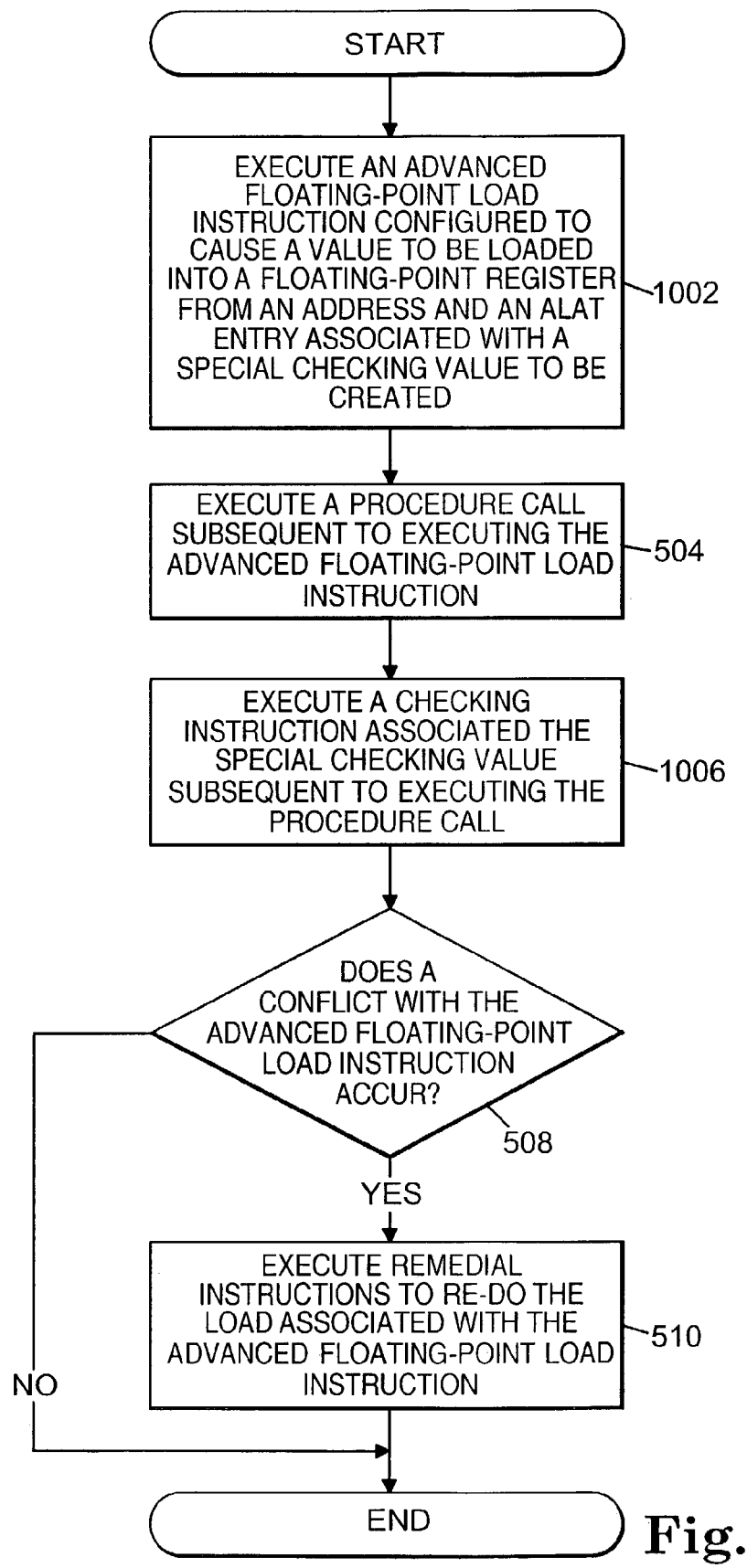
FIG. 10 is a flow chart illustrating a second embodiment of a method for performing an advanced load operation prior to a procedure call.
Figure 11:
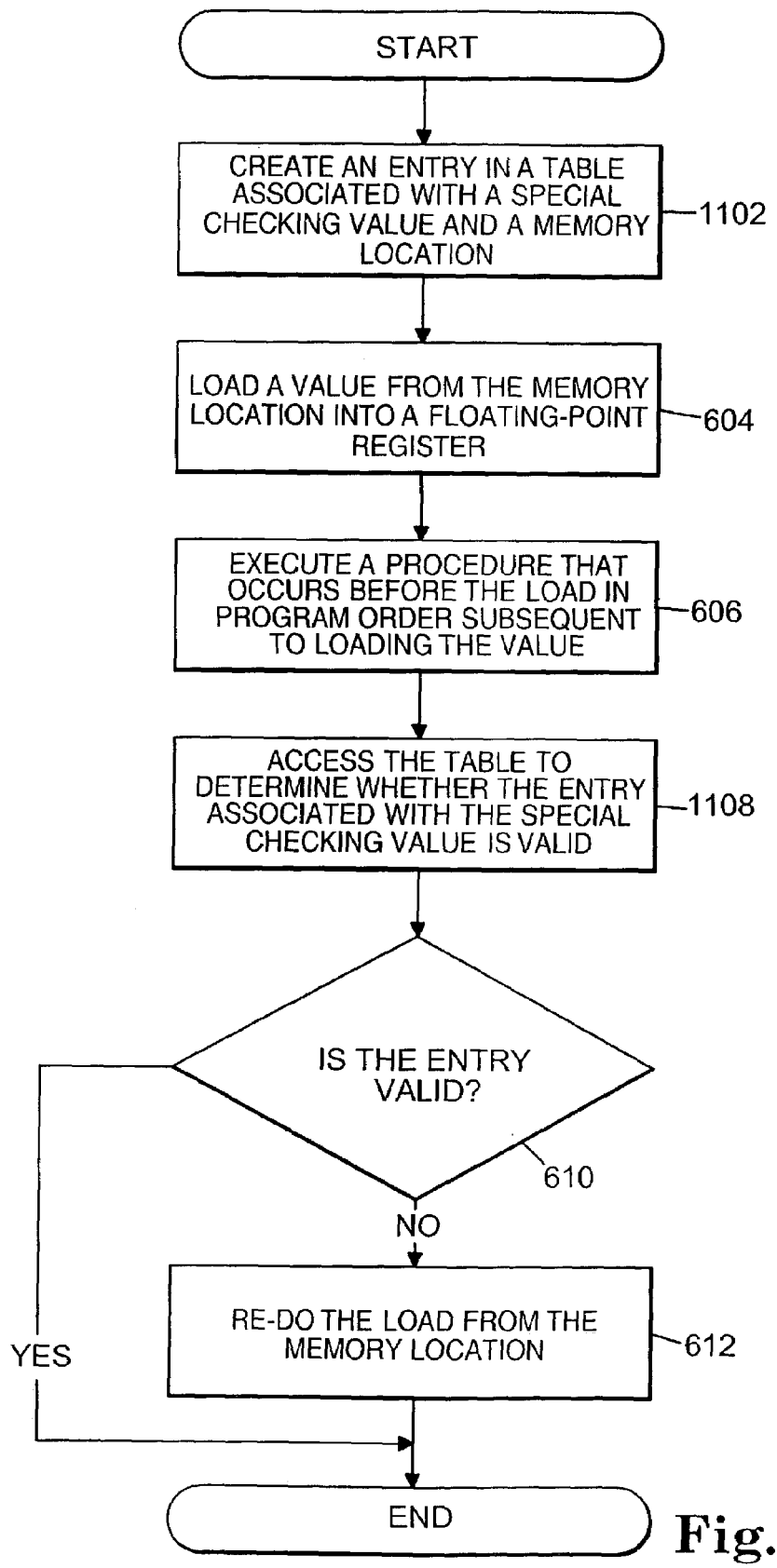
FIG. 11 is a flow chart illustrating a second embodiment of a method for executing instructions to cause an advanced load operation to be performed prior to a procedure call.

Embodiments of methods to perform the type of data speculation using advanced load instruction 812 are shown in FIGS. 9–11 and will be described with reference to modified code portion 800.

FIG. 9 is a flow chart illustrating a second embodiment of a method for scheduling an advanced load operation prior to a procedure call where the calling procedure and the called procedure may each use a non-stacked register set such as floating-point registers 114. FIG. 9 operates in substantially the same way as FIG. 4 with two primary differences.

First, advanced floating-point load instruction 812 associated with a tag value "t2" is inserted into the modified code sequence as indicated in a block 902. Advanced floating-point load instruction 812 specifies the tag value. Advanced load instruction 812 is configured to load a value from an address into a target register, "f1", in floating-point registers 114. Advanced load instruction 812 is also configured to cause an entry 202 to be created in ALAT 116 and store the tag value "t2" in the entry along with the address, a size of the load, and a register type specification that indicates that the entry 202 is associated with an advanced floating-point load that is executed before a procedure call. Advanced load instruction 812 is also configured not to store a value that identifies the floating-point target register "f1" in the entry.

Second, checking instruction 814 associated with the tag value "t2" and advanced load instruction 812 is inserted into the modified code sequence as indicated by a block 906. Checking instruction 814 is inserted subsequent to the procedure call and is used to determine whether a conflict occurred with advanced load instruction 812.

The functions of blocks 404 and 408 are performed in the method shown in FIG. 9 in substantially the same way as they are described above with reference to FIG. 4.

The embodiment of the method described in FIG. 9 is employed by compiler 127. Accordingly, compiler 127 may cause data speculation to occur prior to a procedure call by scheduling instructions for execution in a program using the method just described. Compiler 127 is one example of a program that is storable on a computer-readable medium, such as memory system 120, and is executable by computer system 100. In other embodiments, compiler 127 may be stored on and executed from other computer-readable media including portable media such as a disk or CD-ROM to create programs that include the data speculation technique illustrated in FIG. 9.

FIG. 10 is a flow chart illustrating a second embodiment of a method for performing an advanced load operation prior to a procedure call where the calling procedure and the called procedure may each use a non-stacked register set such as floating-point registers 114. In particular, processor 110 executes the instructions in modified code sequence 800 such that advanced load instruction 812 is executed prior to procedure call 302. FIG. 10 operates in substantially the same way as FIG. 5 with two primary differences.

First, floating-point advanced load instruction 812, which is configured to cause a value to be loaded from an address into a register "f1" from floating-point registers 114 and an ALAT entry 202 associated with a tag value "t2" to be created, is executed as indicated in a block 1002. Accordingly, the load caused by advanced load instruction 812 logically occurs prior to the procedure, "foo", being called for execution by procedure call 302.

Second, checking instruction 814, which is associated with tag value "t2" and advanced load instruction 812, is executed subsequent to executing procedure call 302 as indicated by a block 1006. Processor 110 executes checking instruction 814 to determine whether a conflict occurred with advanced load instruction 812.

The functions of blocks 504, 508 and 510 are performed in the method shown in FIG. 10 in substantially the same way as they are described above with reference to FIG. 5.

FIG. 11 is a flow chart illustrating a second embodiment of a method for executing instructions to cause an advanced load operation to be performed prior to a procedure call where the calling procedure and the called procedure may each use a non-stacked register set such as floating-point registers 114. Processor 110 is configured to perform the method of FIG. 11. FIG. 11 operates in substantially the same way as FIG. 6 with two primary differences.

First, an entry, such as an entry 202, associated with tag value "t2" and a memory location is created in a table, such as ALAT 116, as indicated by a block 1102.

Second, the table is accessed to determine whether the entry associated with tag value "t2" is valid as indicated in a block 1108.

The functions of blocks 604, 606, 610 and 612 are performed in the method shown in FIG. 11 in substantially the same way as they are described above with reference to FIG. 6.

In the embodiment described above with reference to FIGS. 8–11, a special checking value that is not associated with a register is used by advanced load instruction 812. Checking instruction 814 detects conflicts with advanced load instruction 812 using the ALAT entry that contains the special checking value. Because the ALAT implements a renaming mechanism for the special checking values, ALAT entries for other advanced load instructions will be distinguishable from the ALAT entry for advanced load instruction 812. Accordingly, checking instruction 814 will correctly detect conflicts with advanced load instruction 812.

Figure 12:
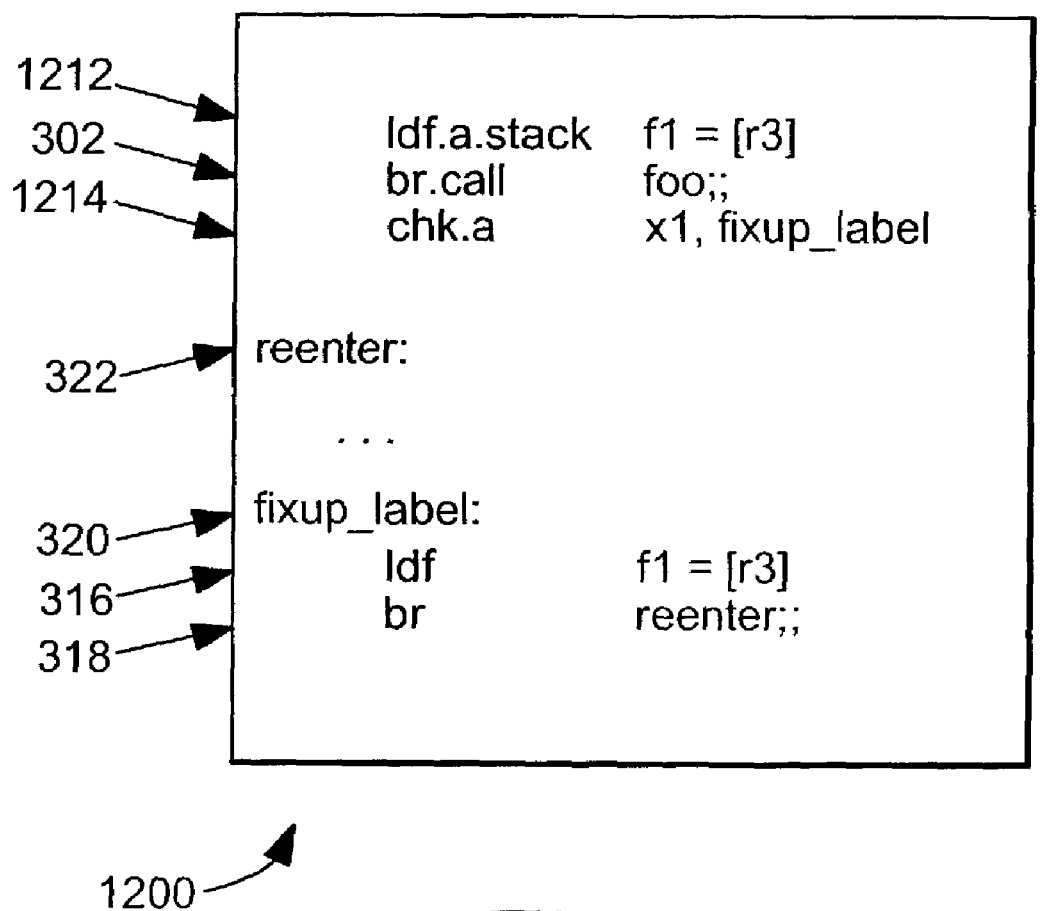
FIG. 12 is a diagram illustrating a third example of a modified code portion.

FIG. 12 is a diagram illustrating a third example of a modified code portion 1200. Like modified code portion 310 from FIG. 3b and modified code portion 800 from FIG. 8, modified code portion 1200 is associated with original code portion 300 from FIG. 3a. Modified code portion 1200 illustrates that the special checking value may be specified implicitly rather than explicitly as shown in modified code portions 310 and 800.

Modified code portion 1200 includes an advanced floating-point load instruction 1212 in place of the advanced floating-point load instruction 312 of modified code portion 310 and the advanced floating-point load instruction 812 of modified code portion 800. Advanced load instruction 1212 operates substantially the same way as either advanced load instructions 312 or 812 as described above with one exception. Advanced load instruction 1212 implicitly specifies its special checking value, i.e., the special checking value does not appear in the instruction syntax as "r2" did in advanced load instruction 312 and as "t2" did in advanced load instruction 812. Instead, compiler 127 and/or processor 110 derive the special checking value from an inherent part of advanced load instruction 1212, such as the floating-point register used by advanced load instruction 1212, using predetermined information. For example, the predetermined information may indicate that the special checking values for floating-point registers 0 through 31 of floating-point registers 114 are values associated with general purpose registers 64 though 95 of general purpose registers 112, respectively. Alternatively, the predetermined information may indicate that the special checking values for floating-point registers 0 through 31 of floating-point registers 114 are tag values 0 through 31, respectively. In execution, processor 110 may also derive the special checking value from checking instruction 1214. For example, the register "f1" may be listed in the instruction syntax of checking instruction 1214 in place of "x1" and processor 110 may derive "x1 from "f1".

In the example shown in FIG. 12, the special checking value is represented by "x1". "x1" may represent a general purpose register, such as in the embodiments described with reference to FIGS. 4–6, or a tag value, such as in the embodiments described with reference to FIGS. 9–11. Because the special checking value for advanced load instruction 1212 is a value "x1", modified code portion 1200 includes checking instruction 1214 in place of checking instruction 314 of FIG. 3b and checking instruction 814 of FIG. 8. Checking instruction 1214 is associated with advanced load instruction 1212 and specifies "x1" as the value to use in accessing ALAT 116. After the procedure "foo" is executed, checking instruction 1214 causes the validity of the entry 202 associated with advanced load instruction 1212 to be examined to determine whether a store conflicted with advanced load instruction 1212. Checking instruction 1214 causes entry 202 to be accessed using the implied special checking value "x1". Conflicts are handled in the manner described above with reference to modified code portion 310.

In addition, ALAT 116 renames the special checking values on procedure calls. In particular, if a special checking value is an implied general purpose register specifier, then regular general purpose register renaming is used. If a special checking value is an implied tag value, then the special checking value is renamed in a manner similar to the renaming of stacked registers.

In the above description, procedure call 302 comprises an unconditional branch instruction. Procedure call 302 may also be any other type of conditional or unconditional instruction configured to cause a procedure to be called.

An instruction that is executed speculatively by processor 10 may be referred to as a speculatively executed instruction. In the embodiments described herein, the procedure call, the advanced load instruction, and the checking instruction may each be speculatively executed instructions.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of converting an original code sequence to a modified code sequence, the original code sequence including a procedure call that is prior to a load instruction configured to load a first value into one of a first plurality of registers, the method comprising:

inserting an advanced load instruction configured to cause the first value to be loaded into the one of the first plurality of registers, wherein the advanced load instruction specifies a second value that differs from a third value that identifies the one of the first plurality of registers;

inserting the procedure call into the modified code sequence subsequent to the advanced load instruction; and inserting a checking instruction that specifies the second value into the modified code sequence subsequent to the procedure call.

2. The method of claim 1 wherein the advanced load instruction is configured to cause the second value to be stored in an entry in a table.

3. The method of claim 2 wherein the checking instruction is configured to determine whether the entry that includes the second value is valid.

4. The method of claim 2 wherein the table comprises an advanced load address table.

5. The method of claim 2 wherein the entry includes a register number field, and wherein the advanced load instruction is configured to cause at least a portion of the second value to be stored into the register number field.

6. The method of claim 2 wherein the entry includes a register type field, and wherein the advanced load instruction is configured to cause a register type associated with the second value to be stored into the register type field.

7. The method of claim 1 wherein each of the first plurality of registers comprises a floating-point register.

8. The method of claim 1 wherein the first plurality of registers comprises a non-stacked register set.

9. The method of claim 1 wherein the second value identifies one of a second plurality of registers.

10. The method of claim 9 wherein each of the second plurality of registers comprises a general purpose register.

11. The method of claim 9 wherein the second plurality of registers comprises a stacked register set.

12. The method of claim 1 wherein the second value comprises a tag value.

13. The method of claim 1 wherein the advanced load explicitly specifies the second value.

14. The method of claim 1 wherein the advanced load implicitly specifies the second value.

15. The method of claim 14 wherein the second value is derived from the one of the first plurality of registers.

16. A computer-readable medium storing a program executable by a computer system and configured to cause the computer system to:
schedule a first instruction for execution, wherein the first instruction is configured to cause a first value to be loaded from a memory location into one of a first plurality of registers, wherein the first instruction is configured to cause an entry that includes a register number field to be created in a table, wherein first instruction is configured to cause a second value to be stored in the register number field, and wherein the second value differs from a third value that identifies the one of the first plurality of registers;
schedule a second instruction for execution subsequent to the first instruction, the second instruction configured to cause a procedure to be called; and
schedule a third instruction for execution subsequent to the second instruction, the third instruction configured to cause the entry to be accessed to determine whether a fourth instruction stored a fourth value to the memory location.

17. The computer-readable medium of claim 16 wherein the second value identifies one of a second plurality of registers.

18. The computer-readable medium of claim 17 wherein the entry includes a register type field, wherein the first instruction is configured to cause a fifth value to be stored in the register type field, and wherein the fifth value is associated with the second plurality of registers.

19. The computer-readable medium of claim 17 wherein the entry includes a register type field, wherein the first instruction is configured to cause a fifth value to be stored in the register type field, and wherein the fifth value differs from a sixth value that is associated with the second plurality of registers.

20. The computer-readable medium of claim 16 wherein the entry includes a type field, wherein the first instruction is configured to cause a fifth value to be stored in the type field, and wherein the fifth value differs from a sixth value that is associated with the first plurality of registers.

21. The computer-readable medium of claim 16 wherein the first instruction comprises a speculatively executed instruction.

22. The computer-readable medium of claim 16 wherein the second instruction comprises a speculatively executed instruction.

23. A computer system comprising:
a first processor that includes first and second pluralities of registers and an advanced load address table (ALAT); and
a memory that includes a program executable by the first processor;
the program configured to cause the first processor to perform an advanced load operation to one of the first plurality of registers prior to a first procedure by:
loading a first value from a memory location into one of the first plurality of registers;
creating an entry in the ALAT that includes the memory location and a second value that differs from a third value that identifies the one of the first plurality of registers in response to loading the first value into the one of the first plurality of registers; and
accessing the ALAT using the second value to determine whether the entry is valid subsequent to executing the first procedure.

24. The computer system of claim 23 wherein the program is configured to cause the first processor to perform the advanced load operation to the one of the first plurality of registers prior to the first procedure by:
storing the second value into a register number field of the entry, wherein the second value is associated with one of the second plurality of registers.

25. The computer system of claim 23 wherein the program is configured to cause the first processor to perform the advanced load operation to the one of the first plurality of registers prior to the first procedure by:
storing the second value into a register number field of the entry, wherein the second value comprises a tag value.

26. The computer system of claim 23 wherein the program includes:
a first instruction configured to cause the first value to be loaded into the one of the first plurality of registers and configured to cause the entry to be created;
a second instruction subsequent to the first instruction in the program and configured to cause the first procedure to be called; and
a third instruction subsequent to the second instruction in the program and configured to cause the entry to be accessed to determine whether the entry is valid.

27. The computer system of claim 26 wherein the first instruction comprises an advanced load instruction to the one of the first plurality of registers.

28. The computer system of claim 26 wherein the third instruction comprises a checking instruction configured to cause the entry to be accessed to determine whether a fourth instruction caused the entry to be invalidated by storing a second value to the memory location.

29. The computer system of claim 28 wherein the fourth instruction is in the first procedure.

30. The computer system of claim 28 further comprising:
a second processor;
wherein the second processor executes the fourth instruction to cause the entry to be invalidated.

31. The computer system of claim 23 wherein the ALAT is configured to prevent the second value from being used in a second procedure executed within the first procedure.

32. A method of performing an advanced load operation prior to a procedure call by a computer system comprising:
executing an advanced load instruction configured to cause a first value to be loaded from a memory location into one of a first plurality of registers and configured to cause an entry associated with one of a second plurality of registers to be created in a table;
executing a procedure associated with the procedure call subsequent to executing the advanced load instruction; and
executing a checking instruction associated with the advanced load instruction subsequent to executing the procedure.

33. The method of claim 32 wherein the advanced load instruction is configured to cause a second value to be stored in a register type field in the entry, and wherein the second value is associated with the second plurality of registers.

34. The method of claim 32 wherein the advanced load instruction is configured to cause a second value to be stored in a register type field in the entry, and wherein the second value differs from a third value associated with the first plurality of registers and a fourth value associated with the second plurality of registers.

35. The method of claim 32 wherein the advanced load instruction explicitly specifies the one of the second plurality of registers.

36. The method of claim 32 wherein the advanced load instruction implicitly specifies the one of the second plurality of registers.

37. The method of claim 32 wherein each of the first plurality of registers comprises a floating-point register.

38. The method of claim 32 wherein each of the second plurality of registers comprises a general purpose register.

* * * * *

UNITED STATES PATENT AND TRADEMARK OFFICE
CERTIFICATE OF CORRECTION

| | | |
|---|---|---|
| PATENT NO. | : 7,103,880 B1 | Page 1 of 1 |
| APPLICATION NO. | : 10/426505 | |
| DATED | : September 5, 2006 | |
| INVENTOR(S) | : Dale C. Morris et al. | |

It is certified that error appears in the above-identified patent and that said Letters Patent is hereby corrected as shown below:

In column 12, line 24, before "may" delete "10" and insert -- 110 --, therefor.

In column 13, line 23, in Claim 13, after "load" insert -- instruction --.

In column 13, line 25, in Claim 14, after "load" insert -- instruction --.

Signed and Sealed this

Twelfth Day of January, 2010

David J. Kappos
*Director of the United States Patent and Trademark Office*